(12) United States Patent
Dykstra et al.

(10) Patent No.: US 10,968,728 B2
(45) Date of Patent: Apr. 6, 2021

(54) REAL-TIME WATER FLOOD OPTIMAL CONTROL WITH REMOTE SENSING

(71) Applicant: HALLIBURTON ENERGY SERVICES, INC., Houston, TX (US)

(72) Inventors: Jason D. Dykstra, Spring, TX (US); Xingyong Song, Houston, TX (US); Yiming Zhao, Katy, TX (US); Fanping Bu, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 434 days.

(21) Appl. No.: 16/074,762

(22) PCT Filed: May 27, 2016

(86) PCT No.: PCT/US2016/034560
§ 371 (c)(1),
(2) Date: Aug. 1, 2018

(87) PCT Pub. No.: WO2017/204817
PCT Pub. Date: Nov. 30, 2017

(65) Prior Publication Data
US 2019/0040724 A1 Feb. 7, 2019

(51) Int. Cl.
*E21B 43/20* (2006.01)
*E21B 34/08* (2006.01)
(Continued)

(52) U.S. Cl.
CPC .............. *E21B 43/20* (2013.01); *C09K 8/58* (2013.01); *E21B 34/08* (2013.01); *E21B 47/06* (2013.01); *E21B 47/135* (2020.05); *E21B 43/164* (2013.01)

(58) Field of Classification Search
CPC .......... E21B 43/12; E21B 43/16; E21B 43/20; E21B 43/25; E21B 43/164; E21B 43/166
See application file for complete search history.

(56) References Cited

U.S. PATENT DOCUMENTS 7,201,221 B2  4/2007  Tubel et al.
8,695,703 B2  4/2014  Dinariev et al.
(Continued)

FOREIGN PATENT DOCUMENTS

WO  2006015277 A1  2/2006
WO  2013040298 A2  3/2013
WO  2015073031 A1  5/2015

OTHER PUBLICATIONS

International Search Report and Written Opinion for PCT/US2016/034560 dated Feb. 13, 2017.

*Primary Examiner* — Michael J Dalbo
(74) *Attorney, Agent, or Firm* — Scott Richardson; C. Tumey Law Group PLLC

(57) ABSTRACT

A method includes generating $k^{th}$, $(k+1)^{th}$, ..., $(k_{final})^{th}$ control inputs for actuating flow control devices of a production well and/or an injection well of a well system during corresponding sampling steps k, (k+1), ..., $k_{final}$, actuating the flow control devices during the $k^{th}$ step using the $k^{th}$ control input, measuring a position of a fluid front and a dynamic state of the well system during the $k^{th}$ step; predicting a dynamic state of the well system at each step (k+1), ..., $k_{final}$ using a state predictor, updating the $(k+1)^{th}$, ..., $(k_{final})^{th}$ control inputs based on the predicted dynamic states, optimizing the $(k+1)^{th}$, ..., $(k_{final})^{th}$ control inputs using a desired cost function, actuating the flow control devices during the $(k+1)^{th}$ step using the optimized value for the $(k+1)^{th}$ step, and measuring the position of the fluid front and a dynamic state of the well system during the $(k+1)^{th}$ step.

23 Claims, 11 Drawing Sheets

(51) Int. Cl.
  *E21B 47/06* (2012.01)
  *E21B 47/135* (2012.01)
  *C09K 8/58* (2006.01)
  *E21B 43/16* (2006.01)

(56) References Cited

U.S. PATENT DOCUMENTS

| | | | |
|---|---|---|---|
| 2002/0027004 A1* | 3/2002 | Bussear | E21B 43/16 166/250.15 |
| 2003/0051873 A1 | 3/2003 | Patzek et al. | |
| 2004/0200615 A1 | 10/2004 | Wilde | |
| 2015/0233234 A1* | 8/2015 | Jannin | E21B 43/32 324/355 |
| 2016/0312585 A1* | 10/2016 | Filippov | E21B 43/12 |

* cited by examiner

300 ─┐

302 — GENERATE $K^{TH}, (K+1)^{TH}, (K+2)^{TH}, ..., (K_{FINAL})^{TH}$ CONTROL INPUTS FOR ACTUATING ONE OR MORE FLOW CONTROL DEVICES OF AT LEAST ONE OF A PRODUCTION WELL AND AN INJECTION WELL OF A WELL SYSTEM DURING CORRESPONDING SAMPLING STEPS $K, (K+1), (K+2), ..., K_{FINAL}$, THE PRODUCTION WELL BEING POSITIONED A PREDETERMINED DISTANCE FROM THE INJECTION WELL IN A FORMATION AND THE ONE OR MORE FLOW CONTROL DEVICES CONTROLLING A FLOW OF A FLUID BETWEEN THE PRODUCTION AND INJECTION WELLS THROUGH THE FORMATION

304 — ACTUATE THE ONE OR MORE FLOW CONTROL DEVICES DURING THE $K^{TH}$ SAMPLING STEP USING THE $K^{TH}$ CONTROL INPUT

306 — MEASURE A POSITION OF A FLUID FRONT AND A DYNAMIC STEP OF THE WELL SYSTEM DURING THE $K^{TH}$ SAMPLING STEP

308 — PREDICT A DYNAMIC STATE OF THE WELL SYSTEM AT EACH SAMPLING STEP $(K+1), (K+2), ..., K_{FINAL}$ USING A STATE PREDICTOR BASED OF A CONTROL INPUT USED DURING A PRECEDING SAMPLING STEP, THE POSITION OF THE FLUID FRONT DURING THE $K^{TH}$ SAMPLING STEP, AND THE DYNAMIC STATE OF THE WELL SYSTEM DURING THE PRECEDING SAMPLING STEP

310 — UPDATE THE $(K+1)^{TH}, (K+2)^{TH}, ..., (K_{FINAL})^{TH}$ CONTROL INPUTS BASED ON THE PREDICTED DYNAMIC STATES (FIG. 3B)

502
CALCULATE A DISTANCE BETWEEN A FLUID FRONT AND A PRODUCTION WELL IN A DESIRED REGION OF A FORMATION, THE PRODUCTION WELL POSITIONED A PREDETERMINED DISTANCE FROM AN INJECTION WELL IN THE FORMATION, AND THE PRODUCTION WELL AND THE INJECTION WELL EACH INCLUDING ONE OR MORE FLOW CONTROL DEVICES THAT CONTROL A FLOW OF A FLUID BETWEEN THE PRODUCTION AND INJECTION WELLS THROUGH THE FORMATION

504
ACTUATE THE ONE OR MORE FLOW CONTROL DEVICES OF AT LEAST ONE OF THE PRODUCTION WELL AND THE INJECTION WELL TO VARY THE DISTANCE BETWEEN THE FLUID FRONT AND THE PRODUCTION WELL USING ONE OR MORE CONTROL INPUTS GENERATED BASED ON THE DISTANCE BETWEEN THE FLUID FRONT AND THE PRODUCTION WELL IN THE DESIRED REGION OF THE FORMATION, AND THE MEDIAN OF DISTANCES BETWEEN THE FLUID FRONT AND THE PRODUCTION WELL IN TWO OR MORE OTHER REGIONS OF THE FORMATION

FIG. 5

REAL-TIME WATER FLOOD OPTIMAL CONTROL WITH REMOTE SENSING

CROSS-REFERENCE TO RELATED APPLICATIONS

The present application is a U.S. National Phase entry under 35 U.S.C. § 371 of International Application No. PCT/US2016/034560, filed on May 27, 2016, the entirety of which is incorporated herein by reference.

BACKGROUND

Oilfield operators drill boreholes into subsurface reservoirs to recover oil and other hydrocarbons. If the reservoir has been partially drained or if the oil is particularly viscous, an oilfield operator will often inject fluids (e.g., water, steam, chemicals, gas, etc.) into the reservoir via one or more injection wells to encourage the hydrocarbons to migrate toward the production well to be produced to the surface. Such operations are known as enhanced oil recovery (EOR) operations and injecting such fluids is often referred to as "flooding."

Flooding can be tailored with varying fluid mixtures, flow rates/pressures, and injection sites, but may nevertheless be difficult to control due to inhomogeneity in the structure of the subsurface formations. The interface between the reservoir fluid and the injected fluid, often termed the "flood front" or the "waterflood front," can develop protrusions and irregularities that may reach the production well before the bulk of the residual oil has been flushed from the reservoir.

Proper management of the fluid front is essential for optimal recovery of oil and profitability of the water flooding operation. Improper management can create permanent, irreparable damage to well fields that can trap oil so that subsequent water flooding becomes futile. For instance, some horizontal wells may be damaged due to the heel-toe effect, where gas or water cones in the heel of the well due to lower pressure at the heel, thereby causing an early end of the well's productive life.

To avoid this, flow control devices such as inflow control device (ICD) valves are often placed along the production pipe to equalize the pressure drop along the entire length of the wellbore, and thereby promote uniform flow of hydrocarbons through the formation. Some ICD valves are variable and the throttling of which can be adjusted in real-time while producing hydrocarbons. ICD valves are often used to produce hydrocarbons by injecting high pressure fluids in the formation using an injection well to cause the hydrocarbons to flow towards an adjacently located production well. However, if the fluid injection process is not regulated or controlled, it can also cause an early end of the well.

BRIEF DESCRIPTION OF THE DRAWINGS

The following figures are included to illustrate certain aspects of the present disclosure, and should not be viewed as exclusive examples. The subject matter disclosed is capable of considerable modifications, alterations, combinations, and equivalents in form and function, without departing from the scope of this disclosure.

FIGS. 3A and 3B are a flowchart of a dynamic state feedback control method for controlling an operation of the injection control valves and/or the ICD valves in the well system of FIG. 1.

FIG. 5 is a flowchart of feedback method for controlling an operation of the injection control valves and/or the ICD valves in the well system of FIG. 1.

DETAILED DESCRIPTION

The present disclosure is related to enabling optimal fluid flooding control for downhole hydrocarbon production and, more particularly, to using real-time fluid front measurement to improve hydrocarbon production and extend the productive life of a well.

Examples described herein discuss how to coordinate operation of one or more downhole flow control devices with a fluid injection operation based on surface and downhole sensor readings. The real-time sensor readings regarding a resulting fluid front are fed back to a control algorithm to control the actuation of the flow control devices (e.g., injection valves, inflow control devices, etc.), and thereby control the injection and/or production operation. The downhole inflow control devices may be regulated based on the fluid injection rate and remote water/gas levels sensing. Examples disclosed also describe how a fluid injection process can be controlled by coordinating with the injection valve and/or ICD valve control inputs and sensor feedback regarding the position of the fluid front in the surrounding subterranean formation, and control the frequency at which the remote sensors obtain the location of the fluid front in the formation based on waterflood control performance.

Figure 1:
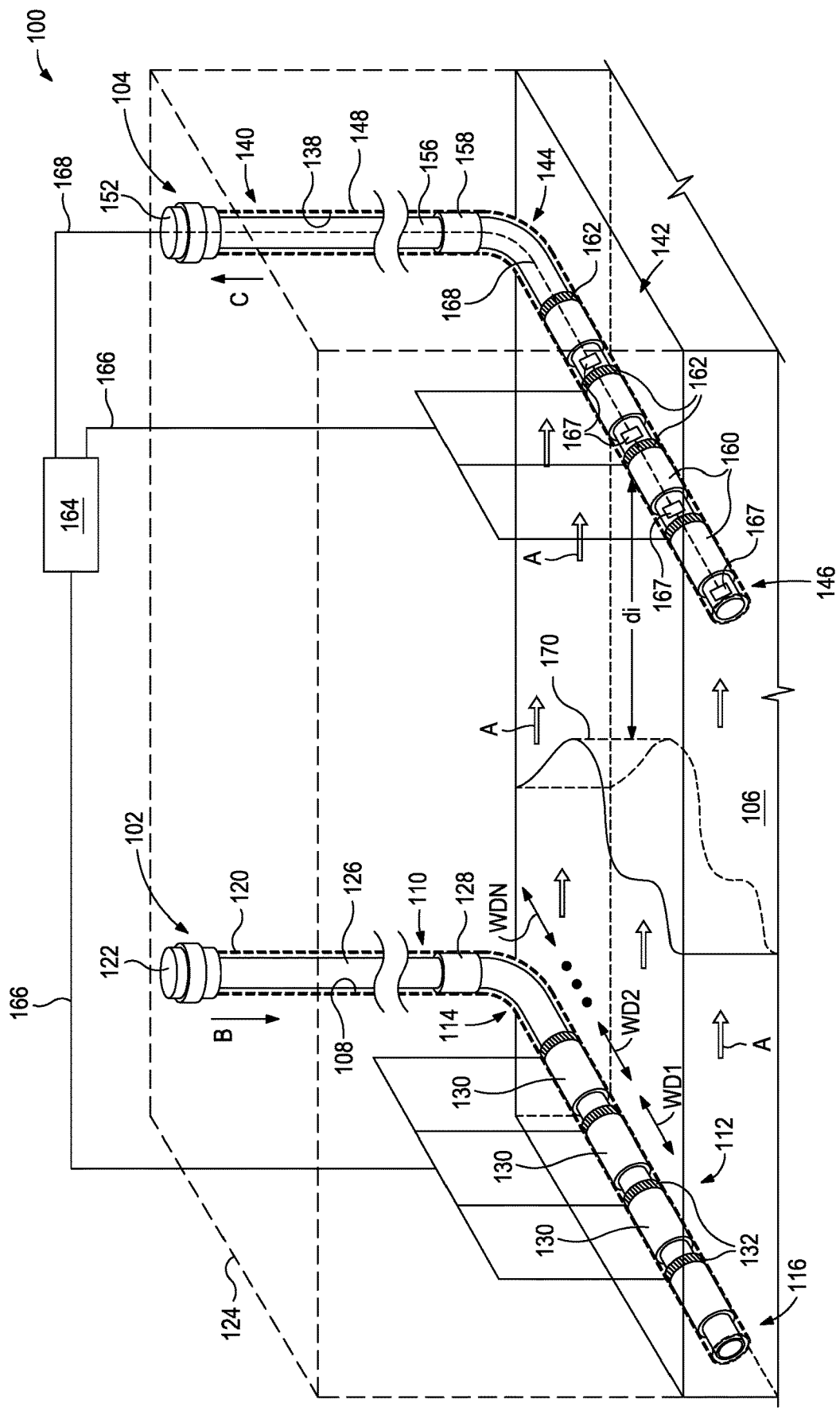
FIG. 1 illustrates a schematic diagram of a well system that can employ the principles of the present disclosure.

FIG. 1 illustrates a schematic diagram of an example well system 100 that may employ the principles of the present disclosure. As illustrated, the well system 100 may include an injection well 102 and a production well 104. The injection well 102 includes a wellbore 108 having a substantially vertical portion 110 and a substantially horizontal portion 112 extending from the vertical portion 110. The injection well 102 defines a heel 114 generally at the location where the vertical portion 110 transitions into the horizontal portion 112. The injection well 102 also defines a toe 116 at the downhole distal end of the horizontal portion 112. A casing 120 is cemented in the vertical portion 110 of the wellbore 108, while the horizontal portion 112 is uncased. The casing 120 is coupled to a wellhead 122 positioned at the Earth's surface 124. An injection tubing string 126 extends from the wellhead 122 through the wellbore 108 and into a hydrocarbon bearing formation 106. The injection tubing string 126 may be a continuous tubing string between the formation 106 and the wellhead 122, a length of tubing coupled to the casing 120 at a liner hanger with a tieback liner extending from the liner hanger to the wellhead 122 or any desired configuration.

One or more packers 128 (one shown) seal the annulus between the injection tubing string 126 and the casing 120. The injection tubing string 126 is used in injecting fluid into the surrounding formation 106. The horizontal portion 112 of the injection tubing string 126 is provided with one or more screen assemblies 130 (four shown) that allow communication of fluid between the formation 106 and the interior of the injection tubing string 126. One or more of the screen assemblies 130 are provided with a flow control device such as an injection control valve 132 to control the flow of fluids between the formation 106 and the interior of the injection tubing string 126.

Like the injection well 102, the production well 104 includes a wellbore 138 having a substantially vertical portion 140 and a substantially horizontal portion 142. The production well 104 also defines a heel 144 and a toe 146, and a casing 148 is cemented in the vertical portion 140 of the wellbore 138, while the horizontal portion 142 is uncased. The casing 148 is coupled to a wellhead 152 positioned at the Earth's surface 124. Although the injection well 102 and the production well 104 are described as being coupled to individual wellheads 122, 152, respectively, the injection well 102 and the production well 104 may alternatively be coupled to a common wellhead, without departing from the scope of the disclosure. A production tubing string 156 extends from wellhead 152 through the wellbore 138 and into the formation 106. One or more packers 158 (one shown) seal the annulus between the production tubing string 156 and the casing 148. The production tubing string 156 operates in producing fluids (e.g., oil, gas, and/or other fluids) from the formation 106 to the surface 124. The horizontal portion 142 of the production tubing string 156 is provided with one or more screen assemblies 160 (four shown) that allow communication of fluid between the formation 106 and the interior of the production tubing string 156. One or more of the screen assemblies 160 are provided with a flow control device such as an ICD valve 162 to control the flow of fluids between the formation 106 and the interior of the production tubing string 156.

Although the injection well 102 and the production well 104 are illustrated as being horizontally separated from each other in the formation 106, in any example, portions of the injection well 102 and the production well 104 may be vertically separated from each other, without departing from the scope of the disclosure. In such cases, the injection well 102 may be located vertically above the production well 104. Also, while the injection well 102 and the production well 104 are described herein in an open hole completion configuration, it should be noted that examples disclosed are equally applicable to wellbores having a cased completion configuration.

During operation, a fluid is conveyed under pressure into the injection well 102 from the surface 124, as is indicated by arrow B, and is subsequently injected into the formation 106 via the screen assemblies 130. A resulting fluid front 170 propagates through the formation 106 toward the production well 104, as generally indicated by the arrows A. The injection control valves 132 regulate the flow of the fluid from the injection well 102 into the formation 106. The fluid front 170 encourages (e.g., pushes, impels, moves, etc.) the hydrocarbons in the formation 106 to flow (migrate) toward the production well 104 to be produced to the surface 124. Example fluids that may be injected into the formation 106 include water, steam, a gas (e.g., carbon dioxide, nitrogen, etc.), or any fluid that will encourage hydrocarbons present in the formation 106 to move toward the production well 104. The hydrocarbons are pushed and flow into the production tubing string 156 via the screen assemblies 160 that are controlled by the ICD valves 162 and are produced to the surface 124 through the production well 104, as generally indicated by arrow C.

The injection control valves 132 and the ICD valves 162 may be controlled using a controller 164 communicably coupled to the injection control valves 132 and the ICD valves 162 via corresponding control cables 166. The controller 164 may be located on the surface 124 or may be remotely located. The control cables 166 may take different forms (e.g., a tubing encapsulated cable) and may include embedded conductors that transmit electrical power and control instructions to control the opening/closing of the injection control valves 132 and the ICD valves 162.

In an example, and as illustrated, a plurality of sensors 167 (four shown) may be positioned in the production well 104 and may be communicably coupled to the controller 164 using sensor cables 168 that transmit power and instructions between the sensors 167 and the controller 164. Additionally or alternatively, in some examples, the sensors 167 may be positioned in the injection well 102. In some other examples, the sensors 167 may be positioned in a third well located adjacent the injection well 102 and the production well 104. It will thus be understood that the sensors 167 can be positioned at any desired location in the formation 106, without departing from the scope of the disclosure.

The sensors 167 may be configured to measure the position of the fluid front 170. In some examples, the sensors 167 may be or include fluid sampling sensors, acoustic/NMR sensing devices, flow sensors, pressure sensors, resistivity sensors, and the like. In other examples, interferometry phase modulation techniques such as Distributed Acoustic Sensing (DAS) may be used to obtain the location of the fluid front 170. In such cases, the sensor cables 168 may be optical waveguides (such as optical fibers or optical ribbons) that may function as a string of linear sensors, or the optical waveguides may include one or more sensors (Fiber Bragg Gratings or the like, not expressly illustrated) positioned at discrete locations axially along the optical waveguides.

The Dynamic State Feedback Control Method

According to the present disclosure, a dynamic state feedback control method is described for controlling the injection control valves 132 and the ICD valves 162 based on the measured real-time location of the fluid front 170 as obtained from the sensors 167. Controlling the injection control valves 132 and the ICD valves 162 may help control the shape, speed, and/or advancement of the fluid front 170. As a result, the fluid front 170 can be managed more efficiently and damage to well fields because of the heel-toe effect, for instance, may be minimized. The shape, speed, and/or advancement of the fluid front 170 may be controlled in order to maximize production, minimize revenue, and/or minimize operational costs, among other things.

As illustrated in FIG. 1, the formation 106 between the horizontal portions 112 and 142 may be divided into imaginary regions N each having a desired width (WD1, WD2, . . . , WDN) and extending between the injection well 102 and the production well 104. In some examples, the number of regions N may be equal to the number of injection valves 132 and ICD valves 162. However, the number of regions N is not limited thereto and may be more or less than the number of injection valves 132 and ICD valves 162, without departing from the scope of the disclosure. In other examples, one or more of the plurality of sensors 167 may be associated with each region N.

The distance $d_i$ in FIG. 1 denotes the distance between the fluid front 170 and the production well 104 in a particular region i, where i=1, 2, 3, . . . , N as measured by the sensors 167. A state predictor equation may be employed to determine and otherwise describe the location of the fluid front 170 in each region i. The state predictor equation may be given as:

$$X_i(k+1) = f_{flow\ dynamics}[X_i(k)] + f_{well}[X_i(k)] + f_{geo-mechanics}[X_i(k)] +$$
$$f_{water\ injection\ dynamics}[X_i(k)] + f_{rock\ interaction}[X_i(k)] + g[u_i(k)]$$
$$y_i(k+1) = h[X_i(k)]$$
$$d_i(k+1) = v[X_i(k)] - \text{collectively referred to as Equation (1),}$$

where f represents the nonlinear function that describes the dynamics equation, including the water/gas/oil flow dynamics $f_{flow\ dynamics}$, geo-mechanics induced formation pressure dynamics $f_{geo-mechanics}$, and the water injection process dynamics $f_{water\ injection\ dynamics}$ $f_{rock\ interaction}$ represents the nonlinear equation describing the rock-interaction dynamics, so that the effect of the water injection dynamics on the well cementation can also be captured and monitored accordingly. g represents the input function projecting control inputs u into the dynamic space equations. $u_i$ is the control input vector that includes the injection control valves 132 and the ICD valves 162 control inputs for the region i.

The control inputs u control the opening/closing of the injection control valves 132 and the ICD valves 162, thereby controlling the rate at which water may be injected into the formation 106 via the injection control valves 132 and the rate at which fluids from the formation 106 may enter the production tubing string 156. As such, by varying the opening/closing of the injection control valves 132 and/or the ICD valves 162, the shape and speed of the fluid front 170 may be controlled. y represents the measured output variables of the well system 100 that are determined (or calculated) based on the outputs from the sensors 167, h is the output function, and $d_i$, as mentioned above, is the fluid front distance in the region i, which measured in real-time (with a desired time sampling interval) using with the optical waveguides 168. v is the function that translates the control states into the distance $d_i$. $X_i$ represents the state vector of the system dynamics at the particular region i and may include multiple dynamic states. For instance, the states may include:

$$X_i(k) = \begin{bmatrix} \text{Water Flow Rate at region } i \\ \text{Oil Flow Rate at region } i \\ \text{Gas Flow rate at region } i \\ \text{Formation Pressure at region } i \\ \text{Water Front Position} \\ \text{Gas Front Position} \\ \text{Pressure created by Water Injection at region } i \end{bmatrix} \quad \text{Equation (2)}$$

However, it should be noted that the number of states in Equation 2 may increase or decrease based on the application and design requirements.

The example dynamic state feedback control method considers the transients of the control dynamics by predicting the effect of the control performed on the injection control valves 132 and/or the ICD valves 162 on a future distance $d_i$ of the fluid front 170. The example control method includes predicting or estimating the future dynamic states of the system 100 at each desired time instance during the control process and adjusting one or more current control inputs to the injection control valves 132 and/or the ICD valves 162 such that the most optimal/desirable future dynamic states profile is generated under a predetermined cost function. The future dynamic states profile may include states that may closely approximate the predicted future dynamic states.

At a sampling step k, for example, a set of control inputs for the sampling step k and for future sampling steps k+1, k+2, . . . , $k_{final}$ are designed. This set of control inputs may be represented as $u_i^k(k), u_i^k(k+1), \ldots, u_i^k(k_{final})$, wherein $u_i^k(k)$ represents the control input for the current sampling step k for the region i, and $u_i^k(k+1), \ldots, u_i^k(k_{final})$ represent the control inputs designed at the current sampling step k for the future sampling steps (k+1), . . . , $k_{final}$, respectively, for the region i. Each control input is a vector that controls the injection control valves 132 and the ICD valves 162 for a region i.

Then, using the state predictor from Equation 1 above, the future dynamic states of the well system 100 may be predicted using the output $y_i(k)$ obtained at step k based on the control input $u_i^k(k)$ and by using the designed future control inputs $u_i^k(k+1), \ldots, u_i^k(k_{final})$. For example, the output $y_i(k)$ may represent the position of the fluid front 170 as measured by the sensors 167. The current dynamic state of the system for the region i at step k may be represented as $\hat{X}_i^k(k)$, and the future dynamic states for the region i may be represented as $\hat{X}_i^k(k+1), \ldots, \hat{X}_i^k(k_{final})$. The future dynamic states may be represented as given below, wherein L denotes a gain used for prediction adjustment/adaptation:

$$\hat{X}_i(k+1) = f_{flow\ dynamics}[\hat{X}_i(k)] + f_{well}[\hat{X}_i(k)] +$$
$$f_{geo-mechanics}[\hat{X}_i(k)] + f_{water\ injection\ dynamics}[\hat{X}_i(k)] +$$
$$f_{rock\ interaction}[\hat{X}_i(k)] + g[u_i(k)] + L(k)(y_i(k) - v[\hat{X}_i(k+1)])$$
$$y_i(k+1) = h[X_i(k+1)]$$
$$d_i(k+1) = v[X_i(k+1)]$$
$$\hat{X}_i(k+2) = f_{flow\ dynamics}[\hat{X}_i(k+1)] + f_{well}[\hat{X}_i(k+1)] +$$
$$f_{geo-mechanics}[\hat{X}_i(k+1)] + f_{water\ injection\ dynamics}[\hat{X}_i(k+1)] +$$
$$f_{rock\ interaction}[\hat{X}_i(k+1)] + g[u_i(k+1)] + L(k)(y_i(k) - v[\hat{X}_i(k)])$$
$$y_i(k+2) = h[X_i(k+2)]$$

-continued $$d_i(k+2) = V[X_i(k+2)]$$

$$\vdots$$

$$\hat{X}_i(k_{final}) = f_{flow\ dynamics}[\hat{X}_i(k_{final}-1)] + f_{well}[\hat{X}_i(k_{final}-1)] +$$
$$f_{geo\text{-}mechancis}[\hat{X}_i(k_{final}-1)] + f_{water\ injection\ dynamics}[\hat{X}_i(k_{final}-1)] +$$
$$f_{rock\ interaction}[\hat{X}_i(k_{final}-1)] + g[u_i(k_{final}-1)] + L(k)(y_i(k) - v[\hat{X}_i(k)])$$

$$y_i(k_{final}) = h[X_i(k_{final})]$$

$$d_i(k_{final}) = v[X_i(k_{final})] - \text{collectively referred to as Equation (3)}.$$

Based on the predicted future dynamic states, a new set of future control inputs $u_i^{k+1}(k+1)$, $u_i^{k+1}(k+2)$, ..., $u_i^{k+1}(k_{final})$ may be designed during the successive sampling step k+1. The future control inputs $u_i^{k+1}(k+1)$, $u_i^{k+1}(k+2)$, ..., $u_i^{k+1}(k_{final})$ may then be optimized using a desired cost function. For instance, the cost function may be given as:

$$\min \sum_{i=1}^{N} \sum_{k}^{k_{final}} W_1((d_i(k) - \text{median}(d_{i\ for\ i=1:N}(k)))^2 + \quad \text{Equation (4)}$$

$$W_2 u_i + W_3 (\text{Uncertainty}(k))^2 +$$

$$W_4 \left( \frac{\text{Formation Pressure} -}{\text{Desired Formation Pressure}} \right)^2 +$$

$$W_5 \left( \frac{\text{Rock Interaction} -}{\text{Desired Rock Interaction}} \right)^2,$$

where $W_1$, $W_2$, $W_3$, ... represent weighting functions for each cost term, k represents the sampling step, $u_i(k)^2$ represents the control input for the sampling step k that minimizes the control energy required for the fluid injection control energy and the ICD valve control energy, and Uncertainty(k) represents the uncertainty of the estimation at sampling step k. As represented by the term $(d_i(k)-\text{median}(d_{i\ for\ i=1:N}(k)))$, the cost function above optimizes the future control inputs $u_i^{k+1}(k+1)$, $u_i^{k+1}(k+2)$, ..., $u_i^{k+1}(k_{final})$ so that the location of the fluid front 170 is uniform across the different regions N.

Alternatively, in some examples, a pressure difference between a point in a region i and the pressure of fluid being injected in the injection well 102 is used to optimize the future control inputs $u_i^{k+1}(k+1)$, $u_i^{k+1}(k+2)$, ..., $u_i^{k+1}(k_{final})$. In this case, the term $(d_i(k)-\text{median}(d_{i\ for\ i=1:N}(k)))$ in the cost function above may be replaced by a pressure drop function Pressure_drop$_i$-median(Pressure_drop$_{i\ for\ i=1:N}$), where Pressure_drop$_i$ represents the pressure drop at a given location in the region i as compared to the pressure at which the fluid is injected in the injection well 102.

In the cost function above, the uncertainty of the estimation at step k, Uncertainty(k), can be calculated as:

$$P(k) = J_f \text{Uncertainty}(k-1) J_f^T + Q(k-1)$$

$$L(k) = P(k) J_v^T [J_v P(k) J_v + R(k)]^{-1}$$

Uncertainty(k)=$[I-L(k)J_v+R(k)]$ collectively referred to as Equation (5), where $J_f$ and $J_v$ are the Jacobian matrices of the nonlinear functions f and v, respectively, and P(k) represents an error covariance matrix. Q represents the dynamics system process noise covariance matrix and R represents the measured noise. Both Q and R are predetermined by off-line calibration or empirical estimation.

At sampling step k+1, the optimized value of the control input $u_i^{k+1}(k+1)$ may be used to control the injection control valves 132 and the ICD valves 162, and the dynamic states X(k+1) and the output y(k+1) may be measured. Using the measured dynamic states X(k+1), the state predictor given in Equation (1) may be updated to obtain an updated state predictor $X_i(k+2)$. The dynamic states $\hat{X}_i^{k+2}(k+2)$, ..., $\hat{X}_i^{k+2}(k_{final})$ for the succeeding sampling step k+2 may be predicted using the updated state predictor $X_i(k+2)$ and the control input $u_i^{k+2}(k+2)$ is calculated using the optimization process described above. If desired, the weighting functions $W_1$, $W_2$, $W_3$, ... of the cost function may be updated in real-time (for instance, based on measured position of the fluid front and the dynamic state of the well system during a preceding sampling step) and the optimization is performed using the updated values of the weighting functions.

The rate or intervals at which the distance $d_i$ between the fluid front 170 and the production well 104 in a region i is obtained using the sensors 167 may be determined based on the control history. For instance, if the fluid front 170 across the different regions i has been controlled in the past to be uniform across all regions i, then the sampling intervals can be larger. In other words, the sensors 167 may be activated less frequently to obtain the distance $d_i$. The sensor sampling time interval may be mathematically represented as:

Sensor Sampling Frequency=preselected sampling frequency,when$d_i$-median($d_{i\ for\ i=1:N}$)≤threshold Otherwise, Sensor Sampling Frequency = preslected sample frequency + $\quad$ Equation 6

$$\sum_{i=1}^{N} gain_1 \times (d_i - \text{median}(d_{i\ for\ i=1:N}) - \text{threshold}) +$$

$$gain_2 \times (d_i - \text{median}(d_{i\ for\ i=1:N}) - \text{threshold})^2 +$$

$$gain_3 \times (d_i - \text{median}(d_{i\ for\ i=1:N}) - \text{threshold})^3 +$$

$$gain_4 \times (d_i - \text{median}(d_{i\ for\ i=1:N}) - \text{threshold})^4$$

where $gain_1$, $gain_2$, $gain_3$, and $gain_4$ represent control gains which may be based on the application and controller design requirements, median represents the median of the distances $d_i$ between the fluid front 170 and the production well 104 in all N regions, and threshold represents a predetermined value based on which the injection control valves 132 and/or the ICD valves 162 are actuated. The threshold may be determined based on wellbore data and data obtained while performing one or more previous wellbore operations.

Figure 2:
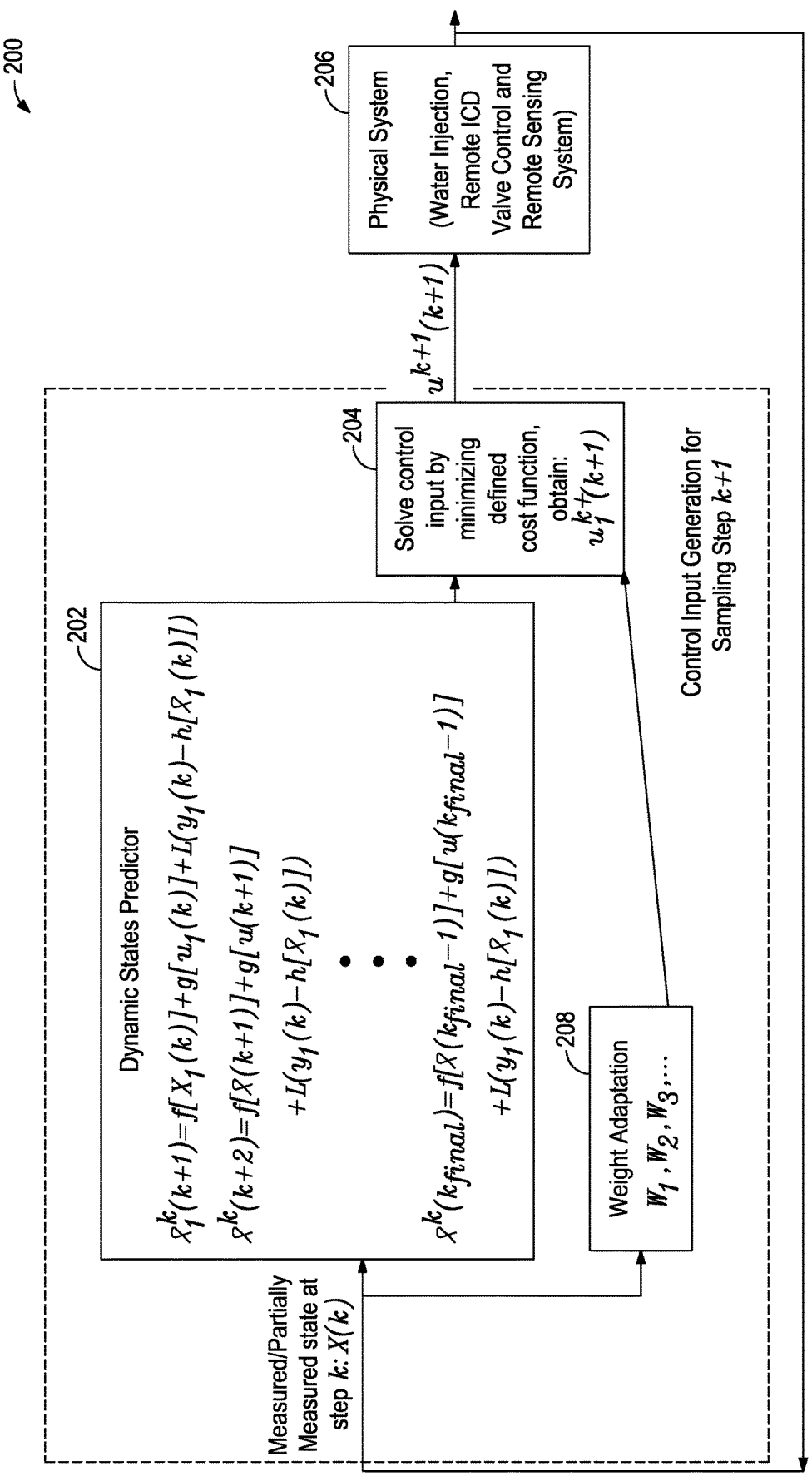
FIG. 2 illustrates block diagram of a control system that implements a dynamic state feedback control method for controlling an operation of the injection control valves and/or the ICD valves in the well system of FIG. 1.

FIG. 2 is a block diagram 200 of the control system that may implement the dynamic state feedback control method. As illustrated, a Dynamic States Predictor 202 may be configured to receive the states of the system X(k) as measured at sampling step k and provide the predicted/estimated dynamic states $\hat{X}_i^k(k+1)$, $\hat{X}_i^k(k+2)$ ..., $\hat{X}_i^k(k_{final})$ of the system as output. The dynamic states may be estimated using desired state predictor equations. For instance, the state predictor equations given above as Equation (1) may be used.

The output of Dynamic States Predictor 202 may be provided to a Control Input Optimizer 204 that estimates future control inputs and optimizes the estimated control inputs. The control inputs may be provided to control the operations of the injection control valves 132 and/or the ICD valves 162 (generally represented by block 206) in the subsequent step k+1. As mentioned above, the control input may be optimized based on a desired cost function. The weighting functions $W_1$, $W_2$, $W_3$, . . . of the cost function may be generated by a Weighting Function Generator 208 that is configured to receive the states of the system X(k) as inputs and generate the weighting functions $W_1$, $W_2$, $W_3$, . . . based on the received inputs. The state of the system and the system output as measured at step k+1 is fed back to the Dynamic States Predictor 202. Based on the feedback, the Dynamic States Predictor 202 updates the state predictor equations. The control input for the subsequent sampling step (k+2) may be generated from the updated state predictor equations.

Figure 3B:
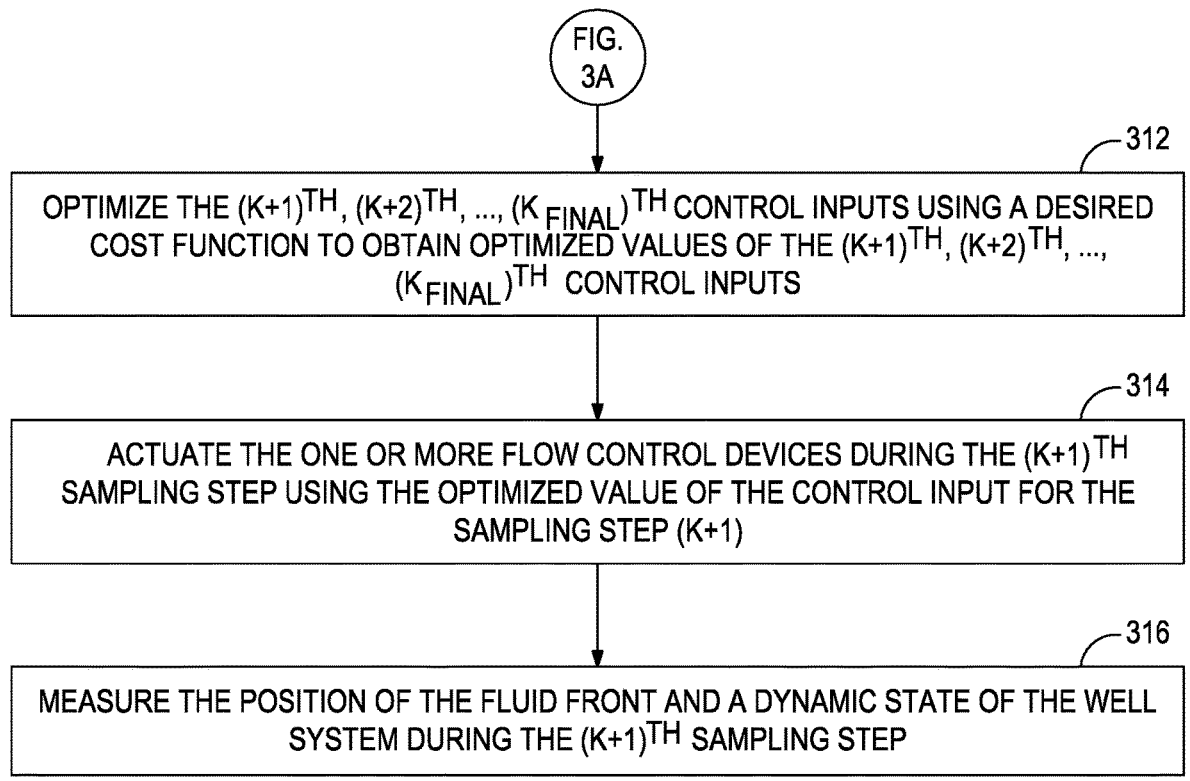

FIGS. 3A and 3B are a flowchart of a dynamic state feedback control method 300 for controlling an operation of the injection control valves 132 and/or the ICD valves 162. The method includes generating $k^{th}$, $(k+1)^{th}$, $(k+2)^{th}$, . . . , $(k_{final})^{th}$ control inputs for actuating one or more flow control devices of at least one of a production well and an injection well of a well system during corresponding sampling steps k, (k+1), (k+2), . . . , $k_{final}$, as at 302. The production well is positioned a predetermined or known distance from the injection well in a formation and the one or more flow control devices control a flow of a fluid between the production and injection wells through the formation. The method 300 further includes measuring a position of a fluid front and a dynamic state of the well system during the $k^{th}$ sampling step, as at 304, predicting a dynamic state of the well system at each sampling step (k+1), (k+2), . . . , $k_{final}$ using a state predictor based on a control input used during a preceding sampling step, the position of the fluid front during the $k^{th}$ sampling step, and the dynamic state of the well system during the preceding sampling step, as at 306, optimizing the $(k+1)^{th}$, $(k+2)^{th}$, . . . , $(k_{final})^{th}$ control inputs using a desired cost function to obtain optimized values of the $(k+1)^{th}$, $(k+2)^{th}$, . . . , $(k_{final})^{th}$ control inputs, as at 308, and actuating the one or more flow control devices during the $(k+1)^{th}$ sampling step using the optimized value of the control input for the sampling step (k+1), as at 310.

The Feedback Control Method

Referring again to FIG. 1, examples disclosed herein may also be directed to a feedback control method, wherein the injection control valves 132 and/or the ICD valves 162 are actuated based on the distance $d_i$ of the fluid front 170 in a particular region i (i=1, 2, 3 . . . N) at a current time instance and a median of the distances $d_i$ between the fluid front 170 and the production well 104 in all N regions. The distances $d_i$ are measured using the sensors 167. The median may be obtained using the distance $d_i$ of the fluid front 170 in each region i, the expected time it takes for the fluid front 170 to travel from its current position in a region i to the production well 104, or a combination thereof. The expected time taken for the fluid front 170 to travel in a region i may be based on the permeability of the formation in the region i.

The control equation to control the actuation of the injection control valves 132 and/or the ICD valves 162 may be given as:

$u_{valve}$=on; if $d_i$−median($d_{i\ for\ i=1:N}$)>threshold#

$u_{valve}$=off; if $d_i$−median $(d_{i\ for\ i=1:N})$≤threshold    collectively referred to as Equations 7 where $u_{valve}$ represents the control input that actuates the injection control valves 132 and/or the ICD valves 162, threshold represents a predetermined value based on which the injection control valves 132 and/or the ICD valves 162 are actuated, and median represents the median of the distances $d_i$ in all N regions. Alternatively, the control equation may be represented as a polynomial function of $d_i$−median($d_{i\ for\ i=1:N}$)−threshold as:

$u_{valve}$=off; when $d_i$−median($d_{i\ for\ i=1:N}$)threshold,

Otherwise, $$u_{valve} = K_1(d_i - \text{median}(d_{i\ for\ i=1:N}) - \text{threshold}) + \qquad \text{Equation 8}$$
$$K_2(d_i - \text{median}(d_{i\ for\ i=1:N}) - \text{threshold})^2 +$$
$$K_3(d_i - \text{median}(d_{i\ for\ i=1:N}) - \text{threshold})^3 +$$
$$K_4(d_i - \text{median}(d_{i\ for\ i=1:N}) - \text{threshold})^4$$

In some examples, a pressure difference between a point in a region i and the pressure of fluid being injected in the injection well 102 is used to control the actuation of the injection control valves 132 and/or the ICD valves 162. Herein, the term ($d_i$(k)−median ($d_{i\ for\ i=1:N}$(k))) in the Equations 7 and 8 may be replaced by a pressure drop function Pressure_drop$_i$−median(Pressure_drop$_{i\ for\ i=1:N}$), where Pressure_drop$_i$ represents the pressure drop at a given location in the region i compared to the pressure at which the fluid is injected in the injection well 102.

From the above control equations, the input $u_{valve}$ to the injection control valves 132 and/or the ICD valves 162 may be adjusted such that the distance $d_i$ of the fluid front 170 in each region i is equal to the median of the distances $d_i$ of the fluid front 170 in the N regions. In an example, the value of the input $u_{valve}$ may control an amount by which the injection control valves 132 and/or the ICD valves 162 are OPEN (or SHUT). For instance, a value of 1 may result in the injection control valves 132 and/or the ICD valves 162 being completely OPEN, a value of 0 may indicate a completely SHUT valve, and any value therebetween may result in the valves being partially OPEN (or SHUT).

The fluid front 170 may not have the same separation distance $d_i$ in all the N regions. The distance $d_i$ in each region i may be such that the fluid front 170 in each region i may take about the same time to reach the production well 104. This is because the velocity of the fluid front 170 is different in different regions due to the differences in the permeabilities of each region. The injection control valves 132 and/or the ICD valves 162 may be controlled based on the permeability of region including the corresponding valves. Because the fluid front 170 may reach the production well 170 at about the same time in each region i, the loss of a well due to the heel-toe effect may be minimized.

Figure 4:
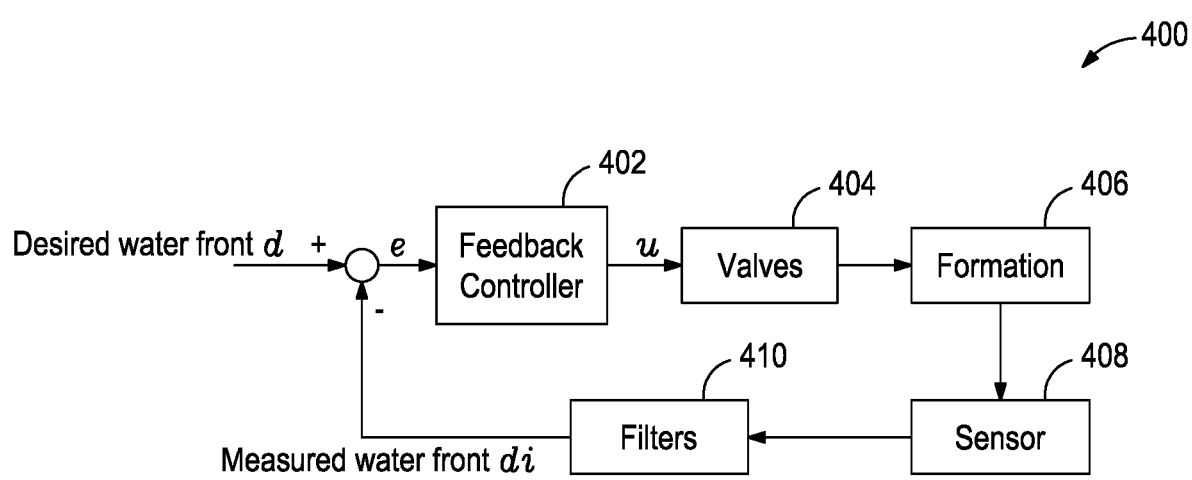
FIG. 4 illustrates block diagram of a control system that implements a feedback control method for controlling an operation of the injection control valves and/or the ICD valves in the well system of FIG. 1.

FIG. 4 is a block diagram 400 of the control system that implements the feedback control method. The feedback controller 402 may be provided a difference between a desired distance d of the fluid front 170 in one or more regions i and the measured distance $d_i$ of the fluid front 170 in the one or more regions i. For instance, the desired distance d may be the median of the distances $d_i$ of the fluid front 170 in the N regions. The feedback controller 402 may calculate the value of the input $u_{valve}$ to be given to the injection control valves 132 and/or the ICD valves 162 based on the feedback control method described above, as at box 404. The actuation of the injection control valves 132 and/or the ICD valves 162 causes the fluid front 170 to travel in the formation, as indicated by the box 406. The distance $d_i$ of the fluid front 170 in one or more regions i is measured using the sensors 167, as indicated by box 408. The outputs of the sensors may be filtered to remove noise or other unwanted signals in the sensor outputs. A difference between the measured distance $d_i$ and the desired distance d of the fluid front 170 is calculated and provided to the feedback controller 402.

FIG. 5 is a flowchart of feedback method 500 for controlling an operation of the injection control valves 132 and/or the ICD valves 162 in the well system 100 of FIG. 1. The method 500 includes calculating a distance between a fluid front and a production well in a desired region of a formation, as at 502. The production well is positioned a predetermined or known distance from an injection well in the formation, and the production well and the injection well each include one or more flow control devices that control a flow of a fluid between the production and injection wells through the formation. The method 500 also includes actuating the one or more flow control devices of at least one of the production well and the injection well to vary the distance between the fluid front and the production well using one or more control inputs generated based on the distance between the fluid front and the production well in the desired region of the formation, and the median of distances between the fluid front and the production well in two or more other regions of the formation, as at 504.

The Extremum Seeking Method

Examples of the disclosure may also be directed to an extremum (e.g., maximum or minimum) seeking method that includes iteratively driving a desired cost function to a minimum by adjusting (or actuating) one or more control inputs in real-time. Again referring to the well system 100 in FIG. 1, the extremum seeking method includes adjusting the control inputs to the ICD valves 162 to minimize a desired cost function. In an example, the desired cost function may be represented by Equation 4 above, which, as mentioned above, may be based on the median of the distances $d_i$ of the fluid front 170 in all N regions or on a pressure difference between a point in a region i and the pressure of fluid being injected in the injection well 102. Alternatively, the desired cost function may be based on the recovery rate of hydrocarbons from the formation 106.

Figure 6:
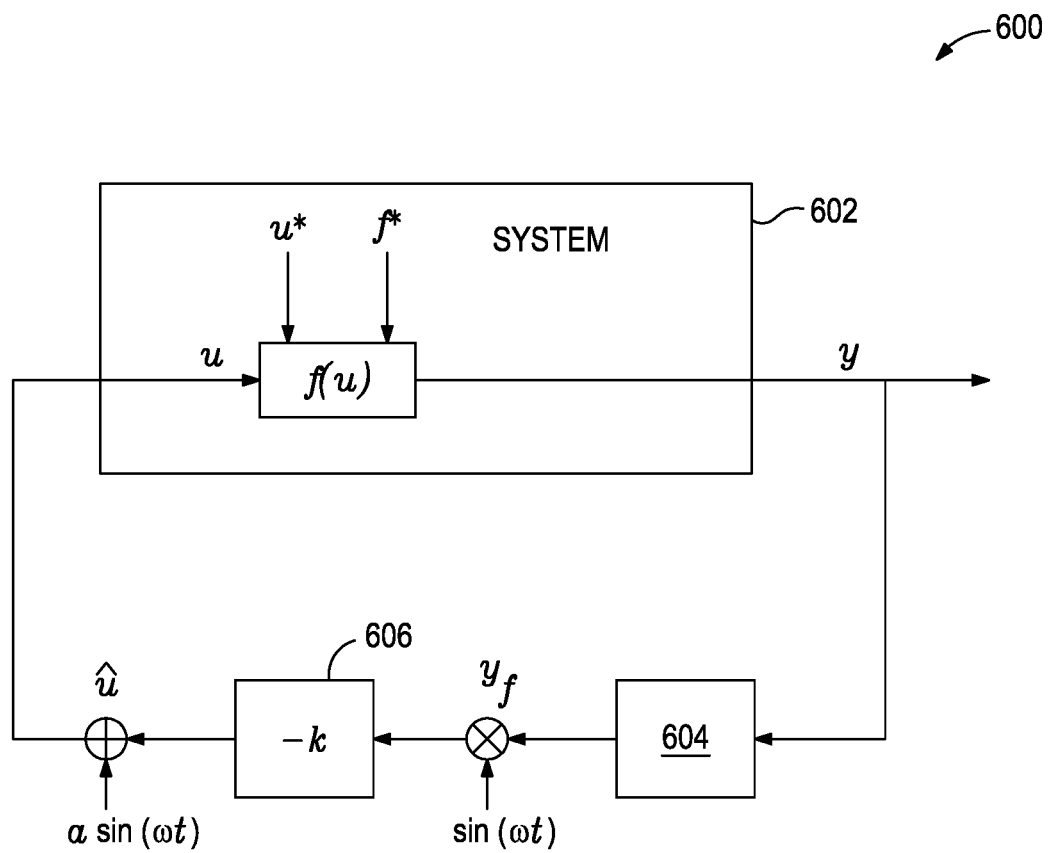
FIG. 6 illustrates a block diagram of a control system that implements the extremum seeking method for controlling an operation of a single ICD valve of the production well of the well system of FIG. 1.

FIG. 6 illustrates a block diagram 600 of a control system that implements the extremum seeking method. A system input signal u that is a summation of a valve control signal û and a perturbation signal a sin(ωt) having a frequency ω, amplitude a, and time period t is provided to a system 602 (e.g., well system 100 in FIG. 1) that is used for waterflood operations. For the purposes of discussing herein, perturbation signal refers to an external signal provided (e.g., a user provided signal) to the system 602 that causes the system 602 (e.g., the ICD valve(s) in the system) to operate in a manner different from a standard operation. The operation of the system 602 due to the perturbation signal may produce one or more outputs that can be differentiated from the outputs produced during the standard operation. Due to the application of the perturbation signal a sin(ωt), the system dynamics of the system 602 are perturbed and this causes the system output y to change. For instance, in case of the well system 100 of FIG. 1, applying the perturbation signal a sin(ωt) may perturb the dynamic states (Equation 2) of the well system 100 and the system output y may represent the position of the fluid front 170 (FIG. 1) as measured by the sensors 167 (FIG. 1). The system output y may include two components, a first component representing the reaction of the system 602 to the valve control signal u and a second component representing the reaction of the system 602 to the perturbation signal a sin(ωt).

The system output y is provided to a low pass filter 604 to filter the first component and generate a filtered output $y_f$ that represents the second component. A convolution operation is performed between the filtered output $y_f$ and a sinusoidal signal sin(ωt). For example, referring to FIG. 1, the convolution operation may be performed to determine a difference between a desired position of the fluid front 170 in a region i of the formation 106 and an actual position of the fluid front 170 in the region i due to the application of the perturbation signal and as measured by the sensors 167. The desired position of the fluid front 170 may be determined in order to maximize production, minimize revenue, and/or minimize operational costs. When system output y increases as system input signal u increases, then the convolution result would have a positive DC component. Using an integrator 606, the result of the convolution operation is integrated (1/s) and multiplied with a negative coefficient (−k) so that the valve control signal u output from the integrator 606 is reduced and the system output y is minimized.

For instance, based on a difference between the desired position of the fluid front 170 and the actual position of the fluid front 170, the valve control signal û is varied such that the difference between the desired position of the fluid front 170 and the actual position of the fluid front 170 is minimized. When the difference is less than or equal to a predetermined value, the perturbation amplitude a is set to zero and the ICD valve is actuated using the valve control signal û. When the difference is greater than the predetermined value, the perturbation amplitude a is updated (increased or decreased) and the process continues to determine a new value for the valve control signal û.

The above extremum seeking method is described with respect to actuating or controlling a single ICD valve and can be expanded to actuate multiple ICD valves, such as the ICD valves 162 in the well system 100 of FIG. 1. The extremum seeking method can be effectively applied when each ICD valve 162 can be individually controlled. Individual control of ICD valves 162 can be achieved by preselecting frequencies $\omega_1, \omega_2, \ldots, \omega_N$ that are spaced at desired intervals from each other. Herein, it is assumed each region N includes one ICD valve 162. However, the number of ICD valves 162 is not restricted thereto and can increase or decrease based on application and as per design requirements.

Figure 7:
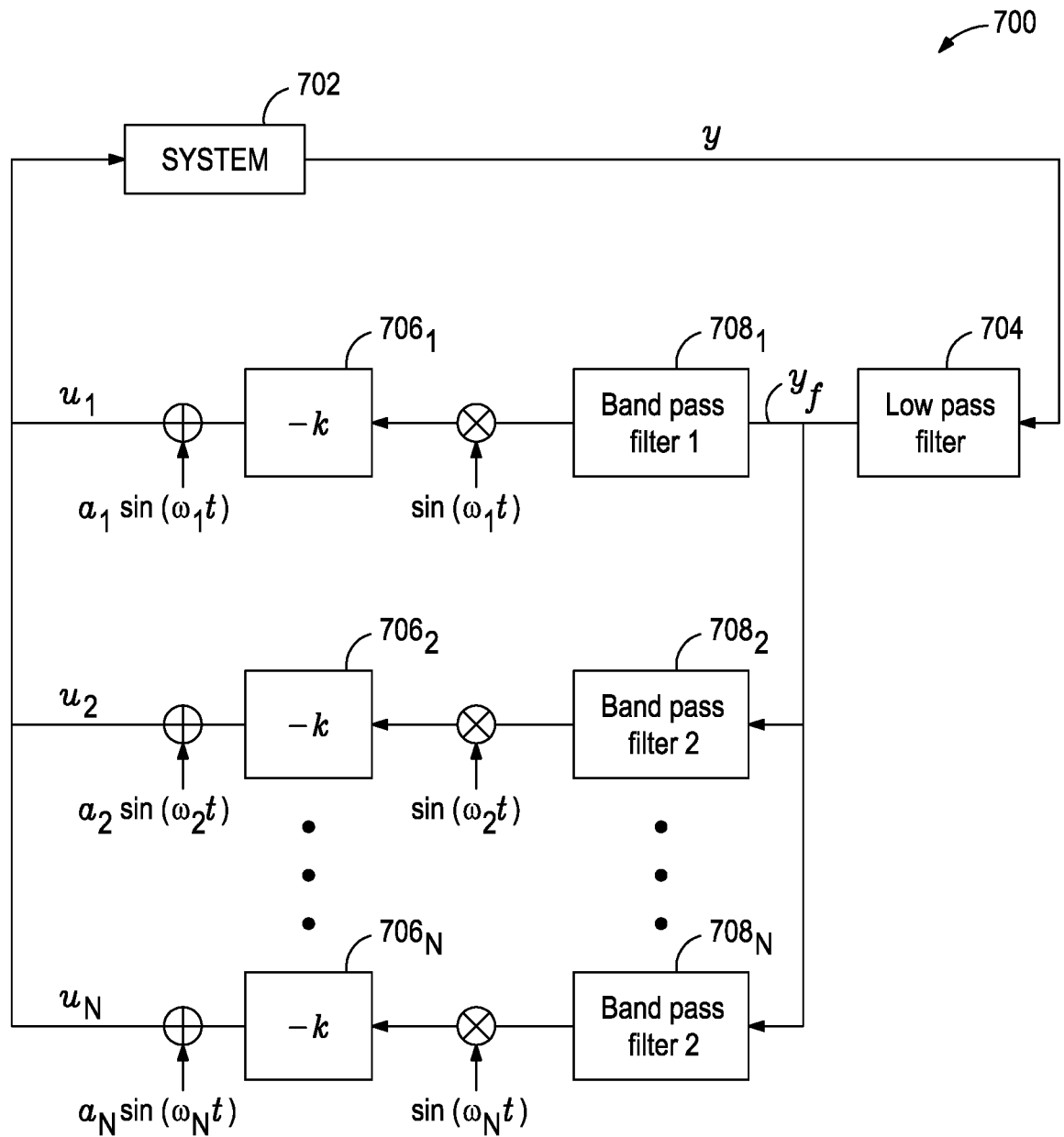
FIG. 7 illustrates a block diagram of a control system for controlling multiple ICD valves using the extremum seeking method described with respect to FIG. 6.

FIG. 7 illustrates a block diagram of a control system 700 for controlling the multiple ICD valves using the extremum seeking method described above. At least a portion of the control system 700 may be implemented in the controller 164 in FIG. 1. Referring to FIGS. 1 and 7, control signals $u_1, u_2, \ldots, u_N$ each for actuating an individual ICD valve 162 are perturbed using corresponding perturbation signals $a_1 \sin(\omega_1 t), a_2 \sin(\omega_2 t), \ldots, a_N \sin(\omega_N t)$, each having a desired frequency ω, amplitude a, and time period t. Due to the application of the perturbation signals $a_1 \sin(\omega_1 t), a_2 \sin(\omega_2 t), \ldots, a_N \sin(\omega_N t)$, the system dynamics of the system 702 (representing the well system 100 of FIG. 1) are perturbed and this causes the output signal y to fluctuate. The output y from the well system 100 may be filtered using a low pass filter 704.

For example, the output y may represent the position of the fluid front 170 as measured by the sensors 167. The filtered output $y_f$ is then provided to a plurality of band pass filters $708_1, 708_2, \ldots, 708_N$. A convolution operation is performed between the output of each band pass filter $708_1, 708_2, \ldots, 708_N$ and a corresponding signal from the signals $\sin(\omega_1 t), \sin(\omega_2 t), \ldots, \sin(\omega_N t)$. The band pass filters $708_1, 708_2, \ldots, 708_N$ are designed based on the selected perturbation frequency ω for each of the ICD valve 162. For each ICD valve 162, the associated band pass filter $708_1$, $708_2, \ldots, 708_N$ separates the effect of perturbation generated by a given ICD valve 162 from the perturbations occurring at other ICD valves 162. A result from each convolution operation undergoes an integration operation (1/s) and is multiplied with a negative coefficient (−k) using integrators $706_1, 706_2, \ldots, 706_N$. The output of each integrator $706_1, 706_2, \ldots, 706_N$ is perturbed using signals $a_1 \sin(\omega_1 t), a_2 \sin(\omega_2 t), \ldots, a_N \sin(\omega_N t)$, as above.

Figure 8:
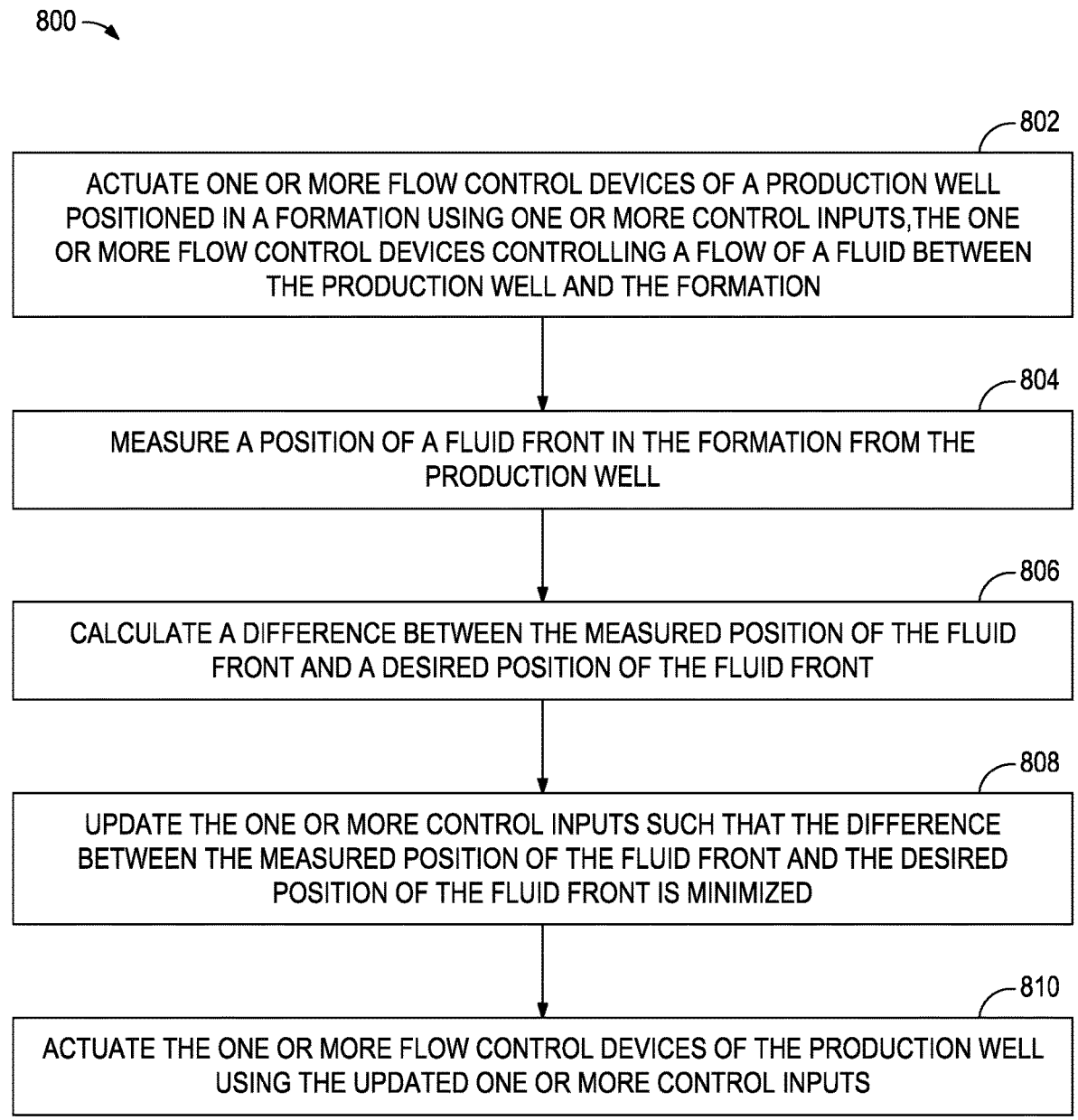
FIG. 8 is a flowchart of extremum seeking method for controlling an operation of the ICD valves in the well system of FIG. 1.

FIG. 8 is a flowchart of extremum seeking method 800 for controlling an operation of the ICD valves 162 in the well system 100 of FIG. 1. The method 800 includes actuating a flow control device of a production well positioned in a formation using a control input, as at 802, measuring the position of the fluid front from the production well, as at 804, calculating a difference between the measured position of the fluid front and a desired position of the fluid front, as at 806, updating the control input such that the difference between the measured position of the fluid front and the desired position of the fluid front is minimized, as at 808, and actuating the flow control device using the updated control input, as at 810.

The effect on the fluid front 170 position as measured by a sensor 167 due to perturbation of an ICD valve 162 decrease as the distance between the ICD valve 162 and the sensor 167 increases. Stated otherwise, a sensor 167 placed adjacent to a given valve 162 is more sensitive to the change in the position of the fluid front 170 due to the perturbation of the given valve 162 than a sensor 167 placed further away from the perturbed valve 162.

Figure 9:
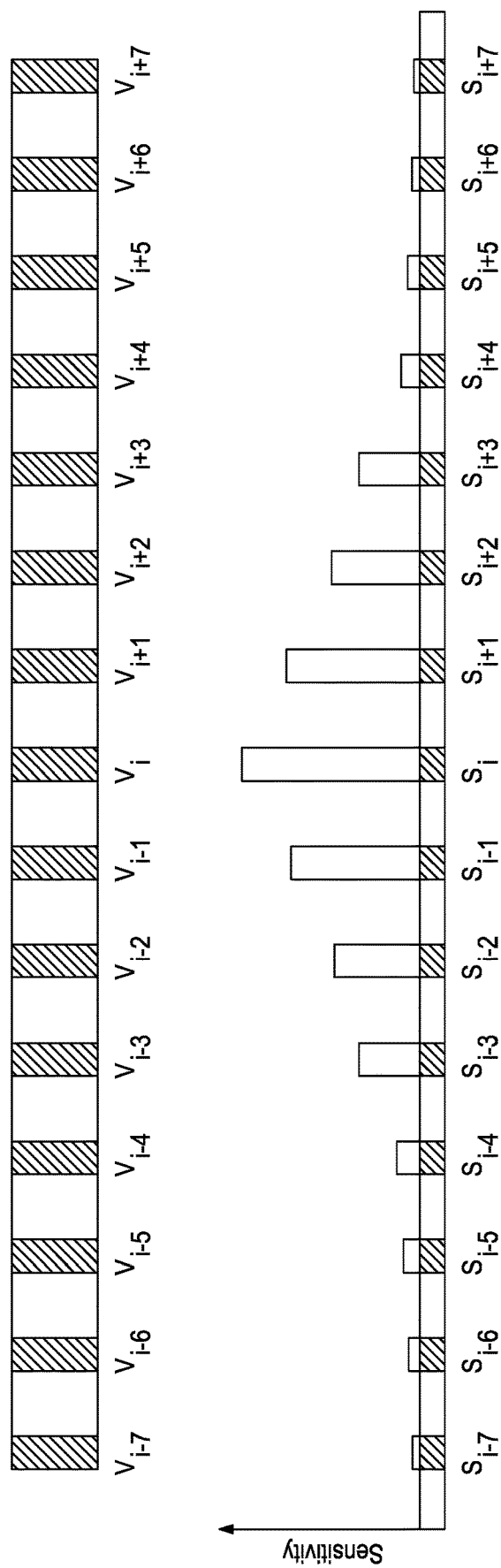
FIG. 9 illustrates a variation in the sensitivity of spatially separated sensors to a change in the position of a fluid front based on the distance between the sensors and a perturbed valve.

FIG. 9 illustrates a variation in the sensitivity of spatially separated sensors to a change in the position of a fluid front based on the distance between the sensors and a perturbed valve. A plurality of valves $V_{i-7}, V_{i-6}, \ldots, V_{i-1}, V_i, V_{i+1}, \ldots, V_{i+7}$ are schematically illustrated as located spatially separated from each other in a formation. A plurality of sensors $S_{i-7}, S_{i-6}, \ldots, S_{i-1}, S_i, S_{i+1}, \ldots, S_{i+7}$ may also be located in the formation. Each sensor $S_{i-7}, S_{i-6}, \ldots, S_{i-1}, S_i, S_{i+1}, \ldots, S_{i+7}$ may be configured to detect a change in the position of a fluid front due to perturbation of a corresponding valve $V_{i-7}, V_{i-6}, \ldots, V_{i-1}, V_i, V_{i+1}, \ldots, V_{i+7}$. Assuming that the valve $V_i$ is perturbed, it is seen that the sensitivity of the sensors $S_{i-7}$ and $S_{i+7}$ (located farthest from the valve $V_i$) to the change in the position of the fluid front is the lowest compared to the sensitivities of all other sensors. Alternatively, the sensitivity of the sensor $S_i$ located closest to the valve $V_i$ is the highest. As a result, the valves $V_{i-7}, V_i$, and $V_{i+7}$ may be perturbed using the same perturbation frequency since the measurements performed by the corresponding sensors $S_{i-7}, S_i$, and $S_{i+7}$ may not influence each other. Thus, it may not be required to perturb each valve with a unique perturbation frequency and the number of perturbation frequencies required may be reduced.

Figure 10:
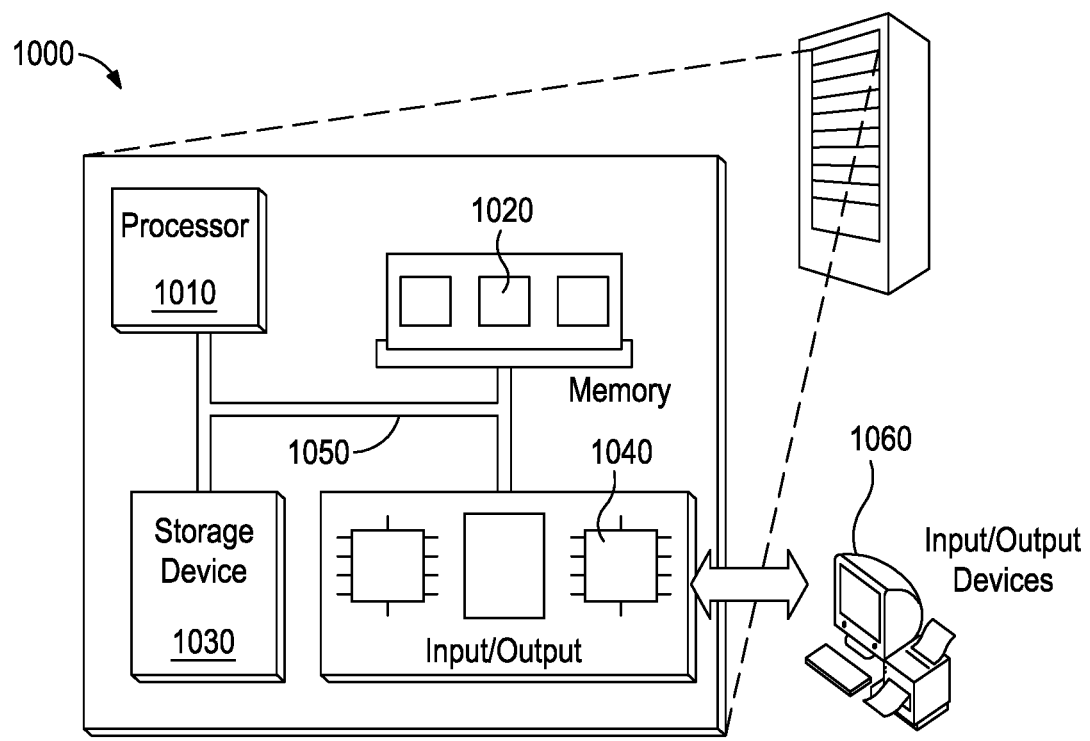
FIG. 10 illustrates an example processing system for configuring and/or controlling the operations of the controller to implement one or more of the example control methods to conduct enhanced oil recovery (EOR) operations.

FIG. 10 illustrates an example processing system 1000 for implementing one or more of the example control methods disclosed above for performing enhanced oil recovery (EOR) operations. In an example, the system 1000 may be or may include the controller 164 in FIG. 1.

The system 1000 may include a processor 1010, a memory 1020, a storage device 1030, and an input/output device 1040. Each of the components 1010, 1020, 1030, and 1040 may be interconnected, for example, using a system bus 1050. The processor 1010 may be processing instructions for execution within the system 1000. In any example, the processor 1010 is a single-threaded processor, a multi-threaded processor, or another type of processor. The processor 1010 may be capable of processing instructions stored in the memory 1020 or on the storage device 1030.

The memory 1020 and the storage device 1030 can store information within the computer system 1000.

The input/output device 1040 may provide input/output operations for the system 1000. In any example, the input/output device 1040 can include one or more network interface devices, e.g., an Ethernet card; a serial communication device, e.g., an RS-232 port; and/or a wireless interface device, e.g., an 802.11 card, a 3G wireless modem, or a 4G wireless modem. In any example, the input/output device can include driver devices configured to receive input data and send output data to other input/output devices, e.g., keyboard, printer and display devices 1060. In any example, mobile computing devices, mobile communication devices, and other devices can be used.

In accordance with any example, the disclosed methods and systems related to scanning and analyzing material may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include non-transitory medium such as random access memory (RAM) devices, read only memory (ROM) devices, optical devices (e.g., CDs or DVDs), and disk drives.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Examples disclosed herein include:

EXAMPLE A

A method that includes generating $k^{th}$, $(k+1)^{th}$, $(k+2)^{th}$, . . . , $(k_{final})^{th}$ control inputs for actuating one or more flow control devices of at least one of a production well and an injection well of a well system during corresponding sampling steps k, (k+1), (k+2), . . . , $k_{final}$, the production well being positioned a known distance from the injection well in a formation and the one or more flow control devices controlling a flow of a fluid between the production and injection wells through the formation, measuring a position of a fluid front and a dynamic state of the well system during the $k^{th}$ sampling step, predicting a dynamic state of the well system at each sampling step (k+1), (k+2), . . . , $k_{final}$ using a state predictor based on a control input used during a preceding sampling step, the position of the fluid front during the $k^{th}$ sampling step, and the dynamic state of the well system during the preceding sampling step, optimizing the $(k+1)^{th}$, $(k+2)^{th}$, . . . , $(k_{final})^{th}$ control inputs using a desired cost function to obtain optimized values of the $(k+1)^{th}$, $(k+2)^{th}$, . . . , $(k_{final})^{th}$ control inputs, and actuating the one or more flow control devices during the $(k+1)^{th}$ sampling step using the optimized value of the control input for the sampling step (k+1).

EXAMPLE B

A system includes a well system including a production well positioned a known distance from an injection well in a formation, the production well and the injection well each including one or more flow control devices that control a flow of a fluid between the corresponding production and injection wells through the formation, and a computer system including a processor and a non-transitory computer readable medium, the computer system being communicatively coupled to the well system and the computer readable medium storing a computer readable program code that when executed by the processor causes the computer system to: generate $k^{th}$, $(k+1)^{th}$, $(k+2)^{th}$, . . . , $(k_{final})^{th}$ control inputs for actuating the one or more flow control devices of at least one of the production well and the injection well during corresponding sampling steps k, (k+1), (k+2), . . . , $k_{final}$, measure a position of a fluid front and a dynamic state of the well system during the $k^{th}$ sampling step, predict a dynamic state of the well system at each sampling step (k+1), (k+2), . . . , $k_{final}$ using a state predictor based on a control input used during a preceding sampling step, the position of the fluid front during the $k^{th}$ sampling step, and the dynamic state of the well system during the preceding sampling step, optimize the $(k+1)^{th}$, $(k+2)^{th}$, . . . , $(k_{final})^{th}$ control inputs using a desired cost function to obtain optimized values of the $(k+1)^{th}$, $(k+2)^{th}$, . . . , $(k_{final})^{th}$ control inputs, and actuate the one or more flow control devices during the $(k+1)^{th}$ sampling step using the optimized value of the control input for the sampling step (k+1).

EXAMPLE C

A method that includes calculating a distance between a fluid front and a production well in a desired region of a formation, the production well positioned a predetermined distance from an injection well in the formation, and the production well and the injection well each including one or more flow control devices that control a flow of a fluid between the production and injection wells through the formation, and actuating the one or more flow control devices of at least one of the production well and the injection well to vary the distance between the fluid front and the production well using one or more control inputs generated based on the distance between the fluid front and the production well in the desired region of the formation, and the median of distances between the fluid front and the production well in two or more other regions of the formation.

EXAMPLE D

A system that includes a well system including a production well and an injection well positioned a predetermined distance from each other in a formation, the production well and the injection well each including one or more flow control devices that control a flow of a fluid between the corresponding production and injection wells through the formation, and a computer system including a processor and a non-transitory computer readable medium, the computer system being communicatively coupled to the well system and the computer readable medium storing a computer readable program code that when executed by the processor causes the computer system to: calculate a distance between a fluid front and the production well in a desired region of the formation, and actuate the one or more flow control devices of at least one of the production well and the injection well to vary the distance between the fluid front and the production well using one or more control inputs generated based on the distance between the fluid front and the production well in the desired region of the formation, and the median of distances between the fluid front and the production well in two or more other regions of the formation.

EXAMPLE E

A method that includes actuating a flow control device of a production well positioned in a formation using a control input to vary a position of a fluid front in the formation, measuring the position of the fluid front from the production well, calculating a difference between the measured position of the fluid front and a desired position of the fluid front, updating the control input such that the difference between the measured position of the fluid front and the desired position of the fluid front is minimized, and actuating the flow control device using the updated control input.

EXAMPLE F

A system that includes a well system including a production well positioned in a formation and including a flow control device that controls a flow of a fluid between the production well and the formation, and a computer system including a processor and a non-transitory computer readable medium, the computer system being communicatively coupled to the well system and the computer readable medium storing a computer readable program code that when executed by the processor causes the computer system to: actuate the flow control device using a control input to vary a position of a fluid front in the formation, measure the position of the fluid front from the production well, calculate a difference between the measured position of the fluid front and a desired position of the fluid front, update the control input such that the difference between the measured position of the fluid front and the desired position of the fluid front is minimized, and actuate the flow control device using the updated control input.

Each of examples A, B, C, D, E, and F may have one or more of the following additional elements in any combination: Element 1: further comprising actuating the one or more flow control devices during the $k^{th}$ sampling step using the $k^{th}$ control input, updating the $(k+1)^{th}, (k+2)^{th}, \ldots, (k_{final})^{th}$ control inputs based on the predicted dynamic states, and measuring the position of the fluid front and a dynamic state of the well system during the $(k+1)^{th}$ sampling step. Element 2: wherein measuring the position of the fluid front comprises measuring the position of the fluid front using one or more sensors positioned in the formation. Element 3: further comprising updating the state predictor based on the dynamic state of the well system measured during the $(k+1)^{th}$ sampling step. Element 4: further comprising updating the predicted dynamic states of the well system at the sampling steps $(k+2), \ldots, k_{final}$ using the updated state predictor to obtain updated dynamic states. Element 5: further comprising updating the $(k+2)^{th}, \ldots, (k_{final})^{th}$ control inputs using the updated dynamic states and actuating the one or more flow control devices using the updated $(k+2)^{th}, \ldots, (k_{final})^{th}$ control inputs. Element 6: further comprising updating the cost function based on the measured position of the fluid front and the dynamic state of the well system during a preceding sampling step. Element 7: wherein optimizing the $(k+1)^{th}, (k+2)^{th}, \ldots, (k_{final})^{th}$ control inputs using the desired cost function comprises selecting a value of the $(k+1)^{th}, (k+2)^{th}, \ldots, (k_{final})^{th}$ control inputs such that a control energy required for actuating the one or more flow control devices is minimized. Element 8: wherein optimizing the $(k+1)^{th}, (k+2)^{th}, \ldots, (k_{final})^{th}$ control inputs using the desired cost function comprises selecting a value of the $(k+1)^{th}, (k+2)^{th}, \ldots, (k_{final})^{th}$ control inputs such that a distance of the fluid front from the production well in different regions of the formation is uniform. Element 9: wherein optimizing the $(k+1)^{th}, (k+2)^{th}, \ldots, (k_{final})^{th}$ control inputs using the desired cost function comprises optimizing the $(k+1)^{th}, (k+2)^{th}, \ldots, (k_{final})^{th}$ control inputs based on a difference between a pressure at a point in the formation and a pressure of the fluid injected in formation via the injection well. Element 10: wherein optimizing the $(k+1)^{th}, (k+2)^{th}, \ldots, (k_{final})^{th}$ control inputs using the desired cost function comprises optimizing the $(k+1)^{th}, (k+2)^{th}, \ldots, (k_{final})^{th}$ control inputs based on an uncertainty in the prediction of dynamic states of the well system during the sampling steps $(k+1), (k+2), \ldots, k_{final}$.

Element 11: wherein executing the program code further causes the computer system to actuate the one or more flow control devices during the $k^{th}$ sampling step using the $k^{th}$ control input, update the $(k+1)^{th}, (k+2)^{th}, \ldots, (k_{final})^{th}$ control inputs based on the predicted dynamic states, and measure the position of the fluid front and a dynamic state of the well system during the $(k+1)^{th}$ sampling step. Element 12: wherein executing the program code further causes the computer system to measure the position of the fluid front using one or more sensors positioned in the formation. Element 13: wherein executing the program code further causes the computer system to update the state predictor based on the dynamic state of the well system measured during the $(k+1)^{th}$ sampling step. Element 14: wherein executing the program code further causes the computer system to update the predicted dynamic states of the well system at the sampling steps $(k+2), \ldots, k_{final}$ using the updated state predictor to obtain updated dynamic states. Element 15: wherein executing the program code further causes the computer system to update the $(k+2)^{th}, \ldots, (k_{final})^{th}$ control inputs using the updated dynamic states and actuating the one or more flow control devices using the updated $(k+2)^{th}, \ldots, (k_{final})^{th}$ control inputs. Element 16: wherein executing the program code further causes the computer system to update the cost function based on the measured position of the fluid front and the dynamic state of the well system during a preceding sampling step. Element 17: wherein executing the program code further causes the computer system to optimize the $(k+1)^{th}, (k+2)^{th}, \ldots, (k_{final})^{th}$ control inputs using the desired cost function by selecting a value of the $(k+1)^{th}, (k+2)^{th}, \ldots, (k_{final})^{th}$ control inputs such that a control energy required for actuating the one or more flow control devices is minimized. Element 18: wherein executing the program code further causes the computer system to optimize the $(k+1)^{th}$, $(k+2)^{th}$, ..., $(k_{final})^{th}$ control inputs using the desired cost function by selecting a value of the $(k+1)^{th}$, $(k+2)^{th}$, ..., $(k_{final})^{th}$ control inputs such that a distance of the fluid front from the production well in different regions of the formation is uniform. Element 19: wherein executing the program code further causes the computer system to optimize the $(k+1)^{th}$, $(k+2)^{th}$, ..., $(k_{final})^{th}$ control inputs based on a difference between a pressure at a point in the formation and a pressure of the fluid injected in formation via the injection well. Element 20: wherein executing the program code further causes the computer system to optimize the $(k+1)^{th}$, $(k+2)^{th}$, ..., $(k_{final})^{th}$ control inputs based on an uncertainty in the prediction of dynamic states of the well system during the sampling steps $(k+1)$, $(k+2)$, ..., $k_{final}$.

Element 21: wherein actuating the one or more flow control devices using the one or more control inputs comprises generating the one or more control inputs to permit the flow of fluids between the corresponding production and injection wells, and the formation when a difference in the distance between the fluid front and the production well in the desired region of the formation, and the median of distances between the fluid front and the production well in two or more other regions of the formation is greater than a predetermined threshold value, and generating the one or more control inputs to prevent the flow of fluids between the corresponding production and injection wells, and the formation when the difference in the distance between the fluid front and the production well in the desired region of the formation, and the median of distances between the fluid front and the production well in the two or more other regions of the formation is less than or equal to the predetermined threshold value. Element 22: wherein actuating the one or more flow control devices using the one or more control inputs comprises generating the one or more control inputs based on a permeability of the formation in the desired region. Element 23: wherein actuating the one or more flow control devices using the one or more control inputs comprises generating the one or more control inputs such that the distance between the fluid front and the production well in the desired region is equal to the median of distances between the fluid front from the production well in the two or more other regions of the formation. Element 24: wherein actuating the one or more flow control devices using the one or more control inputs comprises generating the one or more control inputs based on a difference between the distance of the fluid front from and the production well in the desired region and the median of the distances between the fluid front and the production well in the two or more other regions of the formation.

Element 25: wherein executing the program code further causes the computer system to actuate the one or more flow control devices by generating the one or more control inputs to permit the flow of fluids between the corresponding production and injection wells, and the formation when a difference in the distance between the fluid front and the production well in the desired region of the formation, and the median of distances between the fluid front and the production well in two or more other regions of the formation is greater than a predetermined threshold value, and generating the one or more control inputs to prevent the flow of fluids between the corresponding production and injection wells, and the formation when the difference in the distance between the fluid front and the production well in the desired region of the formation, and the median of distances between the fluid front and the production well in two or more other regions of the formation is less than or equal to the predetermined threshold value. Element 26: wherein executing the program code further causes the computer system to actuate the one or more flow control devices by generating the one or more control inputs based on a permeability of the formation in the desired region. Element 27: wherein executing the program code further causes the computer system to actuate the one or more flow control devices by generating the one or more control inputs such that the distance between the fluid front and the production well in the desired region is equal to the median of distances between the fluid front from the production well in two or more other regions of the formation. Element 28: wherein executing the program code further causes the computer system to actuate the one or more flow control devices by generating the one or more control inputs based on a difference between the distance between the fluid front and the production well in the desired region is equal to the median of distances between the fluid front from the production well in two or more other regions of the formation.

Element 29: wherein the control input is based on a perturbation signal, and updating the control input comprises updating the perturbation signal when the difference between the measured position of the fluid front and the desired position of the fluid front is greater than a predetermined value. Element 30: wherein the control input is a first control input that is based on a first perturbation signal and the flow control device is a first flow control device, and the method further comprises actuating the first flow control device to vary the position of the fluid front in a first region of the formation, and actuating a second flow control device of the production well using a second control input that is based on a second perturbation signal to vary a position of the fluid front in a second region of the formation, wherein the first and second perturbation signals have a same perturbation frequency, and the first and second flow control devices are positioned such that actuating the first flow control device does not affect the position of the fluid front in the second region of the formation and actuating the second flow control device does not affect the position of the fluid front in the first region of the formation. Element 31: wherein measuring the position of the fluid front comprises measuring the position of the fluid front using one or more sensors positioned in the formation.

Element 32: wherein the control input is based on a perturbation signal and executing the program code further causes the computer system to update the control input by updating the perturbation signal when the difference between the measured position of the fluid front and the desired position of the fluid front is greater than a predetermined value. Element 33: wherein the control input is a first control input that is based on a first perturbation signal and the flow control device is a first flow control device, and executing the program code further causes the computer system to actuate the first flow control device to vary the position of the fluid front in a first region of the formation, and actuate a second flow control device of the production well using a second control input that is based on a second perturbation signal to vary a position of the fluid front in a second region of the formation, wherein the first and second perturbation signals have a same perturbation frequency, and the first and second flow control devices are positioned such that actuating the first flow control device does not affect the position of the fluid front in the second region of the formation and actuating the second flow control device does not affect the position of the fluid front in the first region of the formation. Element 34: wherein executing the program code further causes the computer system to measure the position of the fluid front using one or more sensors positioned in the formation.

By way of non-limiting example, example combinations applicable to A, B, C, D, E, and F include: Element 1 with Element 2; Element 1 with Element 3; Element 3 with Element 4; Element 4 with Element 5; Element 11 with Element 12; Element 11 with Element 13; Element 13 with Element 14; and Element 14 with Element 15.

Therefore, the disclosed systems and methods are well adapted to attain the ends and advantages mentioned as well as those that are inherent therein. The examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the illustrative examples disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative examples as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A method, comprising:
   generating $k^{th}$, $(k+1)^{th}$, $(k+2)^{th}$, ..., $(k_{final})^{th}$ control inputs for actuating one or more flow control devices of at least one of a production well and an injection well of a well system during corresponding sampling steps k, (k+1), (k+2), ..., $k_{final}$, the production well being positioned a known distance from the injection well in a formation and the one or more flow control devices controlling a flow of a fluid between the production and injection wells through the formation;
   measuring a position of a fluid front and a dynamic state of the well system during the $k^{th}$ sampling step;
   predicting a dynamic state of the well system at each sampling step (k+1), (k+2), ..., $k_{final}$ using a state predictor based on a control input used during a preceding sampling step, the position of the fluid front during the $k^{th}$ sampling step, and the dynamic state of the well system during the preceding sampling step;
   optimizing the $(k+1)^{th}$, $(k+2)^{th}$, ..., $(k_{final})^{th}$ control inputs using a desired cost function to obtain optimized values of the $(k+1)^{th}$, $(k+2)^{th}$, ..., $(k_{final})^{th}$ control inputs; and
   actuating the one or more flow control devices during the $(k+1)^{th}$ sampling step using the optimized value of the control input for the sampling step (k+1).

2. The method of claim 1, further comprising:
   actuating the one or more flow control devices during the $k^{th}$ sampling step using the $k^{th}$ control input;
   updating the $(k+1)^{th}$, $(k+2)^{th}$, ..., $(k_{final})^{th}$ control inputs based on the predicted dynamic states; and
   measuring the position of the fluid front and a dynamic state of the well system during the $(k+1)^{th}$ sampling step.

3. The method of claim 2, wherein measuring the position of the fluid front comprises measuring the position of the fluid front using one or more sensors positioned in the formation.

4. The method of claim 2, further comprising updating the state predictor based on the dynamic state of the well system measured during the $(k+1)^{th}$ sampling step.

5. The method of claim 4, further comprising updating the predicted dynamic states of the well system at the sampling steps (k+2), ..., $k_{final}$ using the updated state predictor to obtain updated dynamic states.

6. The method of claim 5, further comprising updating the $(k+2)^{th}$, ..., $(k_{final})^{th}$ control inputs using the updated dynamic states and actuating the one or more flow control devices using the updated $(k+2)^{th}$, ..., $(k_{final})^{th}$ control inputs.

7. The method of claim 1, further comprising updating the cost function based on the measured position of the fluid front and the dynamic state of the well system during a preceding sampling step.

8. The method of claim 1, wherein optimizing the $(k+1)^{th}$, $(k+2)^{th}$, ..., $(k_{final})^{th}$ control inputs using the desired cost function comprises selecting a value of the $(k+1)^{th}$, $(k+2)^{th}$, ..., $(k_{final})^{th}$ control inputs such that a control energy required for actuating the one or more flow control devices is minimized.

9. The method of claim 1, wherein optimizing the $(k+1)^{th}$, $(k+2)^{th}$, ..., $(k_{final})^{th}$ control inputs using the desired cost function comprises selecting a value of the $(k+1)^{th}$, $(k+2)^{th}, \ldots, (k_{final})^{th}$ control inputs such that a distance of the fluid front from the production well in different regions of the formation is uniform.

10. The method of claim 1, wherein optimizing the $(k+1)^{th}$, $(k+2)^{th}, \ldots, (k_{final})^{th}$ control inputs using the desired cost function comprises optimizing the $(k+1)^{th}$, $(k+2)^{th}, \ldots, (k_{final})^{th}$ control inputs based on a difference between a pressure at a point in the formation and a pressure of the fluid injected in formation via the injection well.

11. The method of claim 1, wherein optimizing the $(k+1)^{th}$, $(k+2)^{th}, \ldots, (k_{final})^{th}$ control inputs using the desired cost function comprises optimizing the $(k+1)^{th}$, $(k+2)^{th}, \ldots, (k_{final})^{th}$ control inputs based on an uncertainty in the prediction of dynamic states of the well system during the sampling steps $(k+1), (k+2), \ldots, k_{final}$.

12. A system, comprising:
a well system including a production well positioned a known distance from an injection well in a formation, the production well and the injection well each including one or more flow control devices that control a flow of a fluid between the production and injection wells through the formation; and
a computer system including a processor and a non-transitory computer readable medium, the computer system being communicatively coupled to the well system and the computer readable medium storing a computer readable program code that when executed by the processor causes the computer system to:
generate $k^{th}$, $(k+1)^{th}$, $(k+2)^{th}, \ldots, (k_{final})^{th}$ control inputs for actuating the one or more flow control devices of at least one of the production well and the injection well during corresponding sampling steps $k, (k+1), (k+2), \ldots, k_{final}$;
measure a position of a fluid front and a dynamic state of the well system during the $k^{th}$ sampling step;
predict a dynamic state of the well system at each sampling step $(k+1), (k+2), \ldots, k_{final}$ using a state predictor based on a control input used during a preceding sampling step, the position of the fluid front during the $k^{th}$ sampling step, and the dynamic state of the well system during the preceding sampling step;
optimize the $(k+1)^{th}$, $(k+2)^{th}, \ldots, (k_{final})^{th}$ control inputs using a desired cost function to obtain optimized values of the $(k+1)^{th}$, $(k+2)^{th}, \ldots, (k_{final})^{th}$ control inputs; and
actuate the one or more flow control devices during the $(k+1)^{th}$ sampling step using the optimized value of the control input for the sampling step $(k+1)$.

13. The system of claim 12, wherein executing the program code further causes the computer system to:
actuate the one or more flow control devices during the $k^{th}$ sampling step using the $k^{th}$ control input;
update the $(k+1)^{th}$, $(k+2)^{th}$ $(k_{final})^{th}$ control inputs based on the predicted dynamic states; and
measure the position of the fluid front and a dynamic state of the well system during the $(k+1)^{th}$ sampling step.

14. The system of claim 13, wherein executing the program code further causes the computer system to measure the position of the fluid front using one or more sensors positioned in the formation.

15. The system of claim 13, wherein executing the program code further causes the computer system to update the state predictor based on the dynamic state of the well system measured during the $(k+1)^{th}$ sampling step.

16. The system of claim 15, wherein executing the program code further causes the computer system to update the predicted dynamic states of the well system at the sampling steps $(k+2), \ldots, k_{final}$ using the updated state predictor to obtain updated dynamic states.

17. The system of claim 16, wherein executing the program code further causes the computer system to update the $(k+2)^{th}, \ldots, (k_{final})^{th}$ control inputs using the updated dynamic states and actuating the one or more flow control devices using the updated $(k+2)^{th}, \ldots, (k_{final})^{th}$ control inputs.

18. The system of claim 12, wherein executing the program code further causes the computer system to update the cost function based on the measured position of the fluid front and the dynamic state of the well system during a preceding sampling step.

19. The system of claim 12, wherein executing the program code further causes the computer system to optimize the $(k+1)^{th}, (k+2)^{th}, \ldots, (k_{final})^{th}$ control inputs using the desired cost function by selecting a value of the $(k+1)^{th}, (k+2)^{th}, \ldots, (k_{final})^{th}$ control inputs such that a control energy required for actuating the one or more flow control devices is minimized.

20. The system of claim 12, wherein executing the program code further causes the computer system to optimize the $(k+1)^{th}, (k+2)^{th}, \ldots, (k_{final})^{th}$ control inputs using the desired cost function by selecting a value of the $(k+1)^{th}, (k+2)^{th}, \ldots, (k_{final})^{th}$ control inputs such that a distance of the fluid front from the production well in different regions of the formation is uniform.

21. The system of claim 12, wherein executing the program code further causes the computer system to optimize the $(k+1)^{th}, (k+2)^{th}, \ldots, (k_{final})^{th}$ control inputs based on a difference between a pressure at a point in the formation and a pressure of the fluid injected in formation via the injection well.

22. The system of claim 12, wherein executing the program code further causes the computer system to optimize the $(k+1)^{th}, (k+2)^{th}, \ldots, (k_{final})$ control inputs based on an uncertainty in the prediction of dynamic states of the well system during the sampling steps $(k+1), (k+2), \ldots, k_{final}$.

23. A method, comprising:
calculating a distance between a fluid front and a production well in a desired region of a formation, the production well positioned a predetermined distance from an injection well in the formation, and the production well and the injection well each including one or more flow control devices that control a flow of a fluid between the production and injection wells through the formation; and
actuating the one or more flow control devices of at least one of the production well and the injection well to vary the distance between the fluid front and the production well using one or more control inputs generated based on the distance between the fluid front and the production well in the desired region of the formation, and a median of distances between the fluid front and the production well in two or more other regions of the formation.

* * * * *